Figure 1:
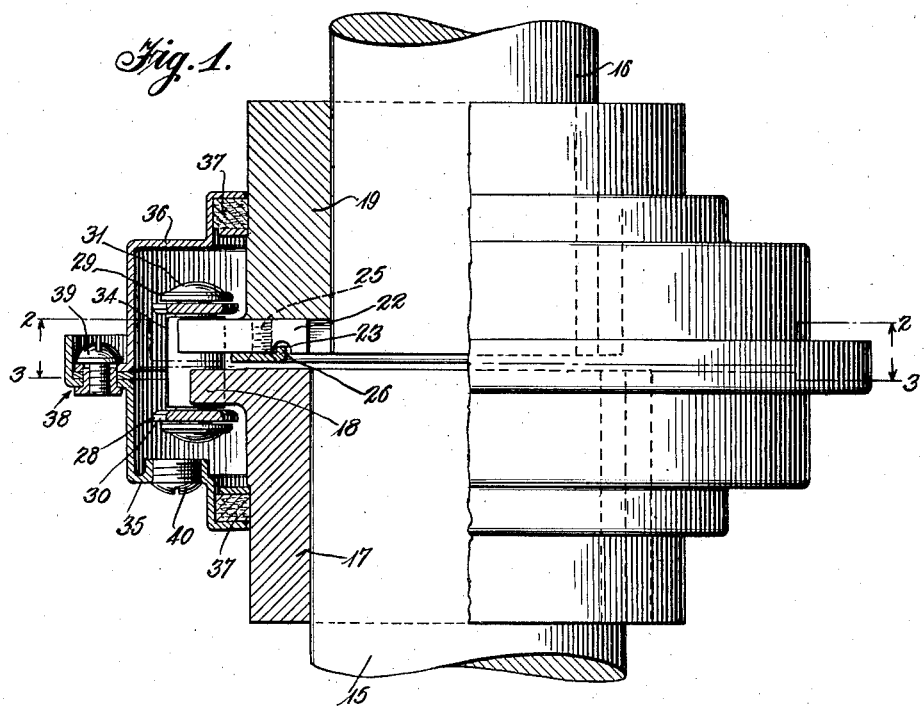

Dec. 31, 1940.         W. S. CAMPBELL         2,227,333
RESILIENT FLEXIBLE COUPLING
Filed Oct. 11, 1938         5 Sheets-Sheet 1

Inventor
William S. Campbell
By L. Donald Myers
Attorney

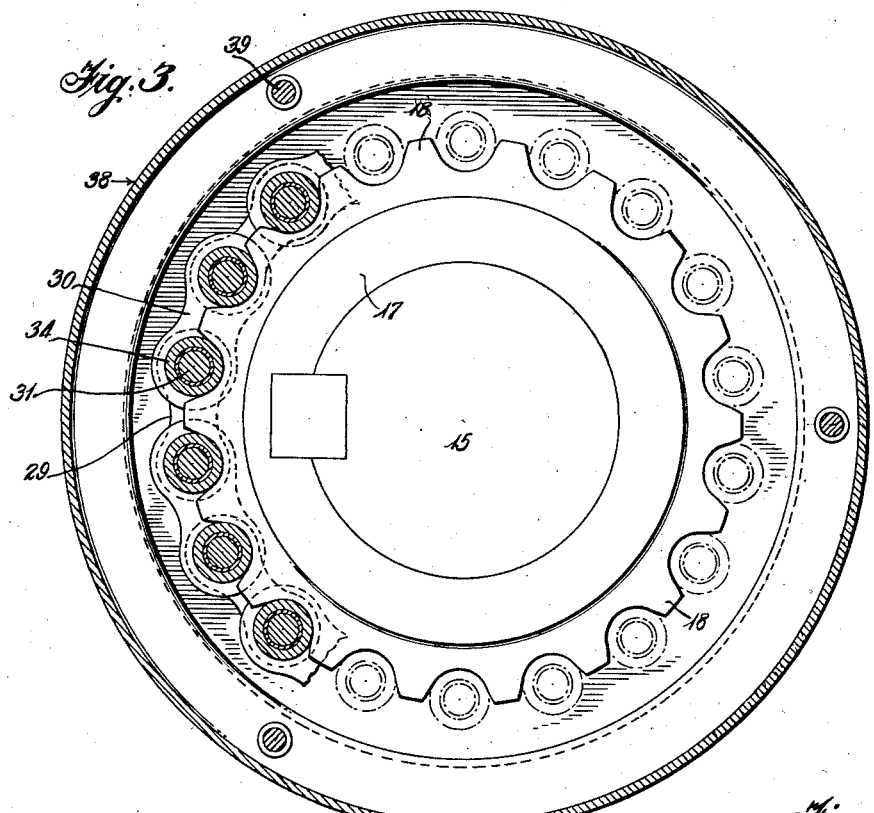

Dec. 31, 1940.    W. S. CAMPBELL    2,227,333
RESILIENT FLEXIBLE COUPLING
Filed Oct. 11, 1938    5 Sheets-Sheet 3

Inventor
William S. Campbell
By L. Donald Myers
Attorney

Dec. 31, 1940. W. S. CAMPBELL 2,227,333
RESILIENT FLEXIBLE COUPLING
Filed Oct. 11, 1938 5 Sheets-Sheet 4
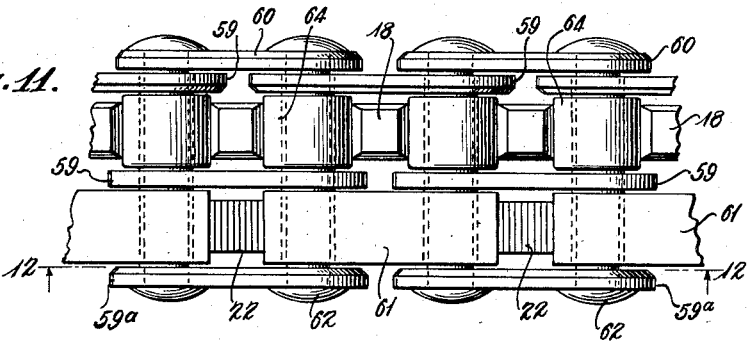
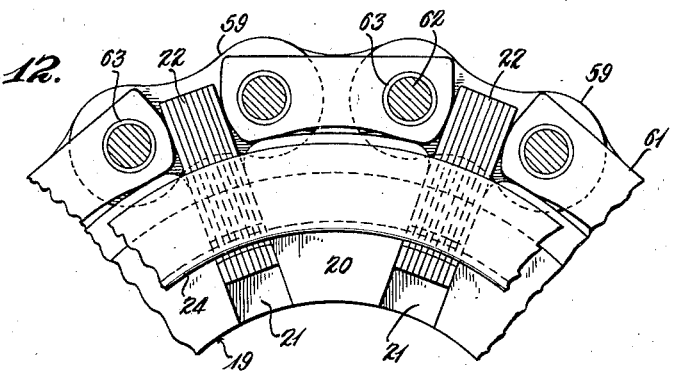
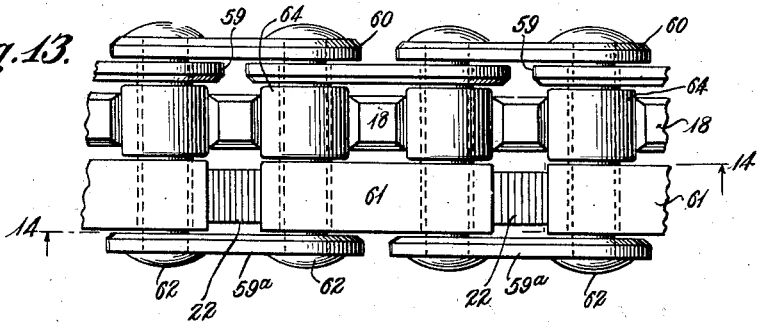
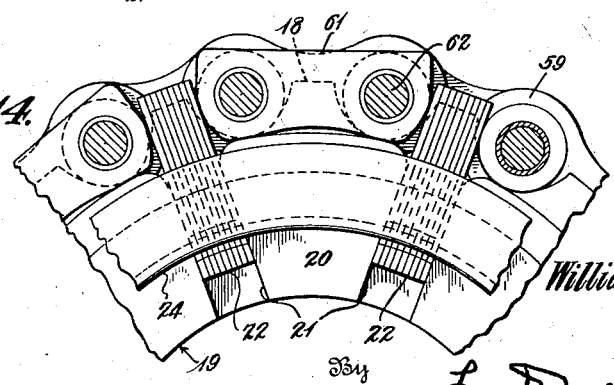
Inventor
William S. Campbell
By L. Donald Myers
Attorney Dec. 31, 1940.  W. S. CAMPBELL  2,227,333
RESILIENT FLEXIBLE COUPLING
Filed Oct. 11, 1938   5 Sheets-Sheet 5

Inventor
William S. Campbell
By L. Donald Myers
Attorney

Patented Dec. 31, 1940

2,227,333

UNITED STATES PATENT OFFICE 2,227,333

RESILIENT FLEXIBLE COUPLING

William S. Campbell, Glenside, Pa., assignor to Link-Belt Company, a corporation of Illinois Application October 11, 1938, Serial No. 234,474

23 Claims. (Cl. 64—15)

This invention relates to new and useful improvements in resilient flexible couplings for drivingly interconnecting two shafts arranged in end to end relation.

A well-known type of coupling for drivingly interconnecting two shafts arranged in aligned or approximately aligned relation consists of two cut tooth sprocket wheels mounted one on each shaft extremity with an endless roller chain connecting the sprocket wheels. This type of coupling provides a very satisfactory form of flexible connection for either high or low speed drives and allows for reasonable relative end float of the shafts and slight misalignment. It entirely lacks, however, the resiliency necessary to absorb sudden and abnormal shocks, such as are encountered in starting and stopping machines, and the like.

It is a primary object of this invention to provide a coupling for interconnecting drive and driven shafts which will not only possess flexibility to allow for reasonable misalignment and relative end float, but will also possess sufficient resiliency to absorb sudden and abnormal shocks.

A more specific object of the invention is to provide a sprocket wheel and roller chain type of shaft coupling which will possess the desired flexibility and resiliency referred to above.

A still further object of the invention is to provide a resilient flexible coupling of the sprocket wheel and chain type which will be interchangeable with the standard, merely flexible coupling without necessitating varying any of the standard overall dimensions and which will permit conversion of the standard flexible couplings to resilient flexible couplings by merely replacing either one or both of the cut tooth sprockets with sprockets of special construction while retaining the standard roller chain, grease casing, etc.

Other objects and advantages of the invention will be apparent during the course of the following description.

Figure 2:
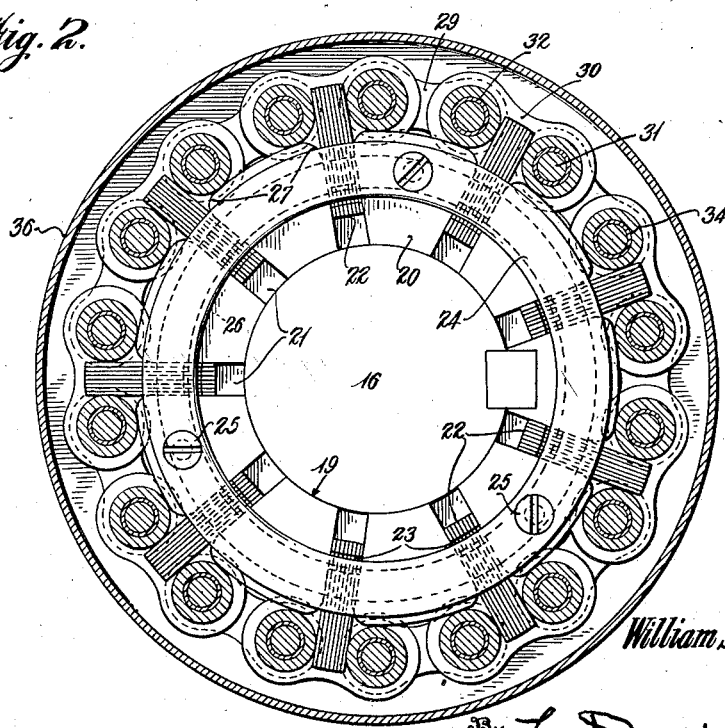
Figure 6:
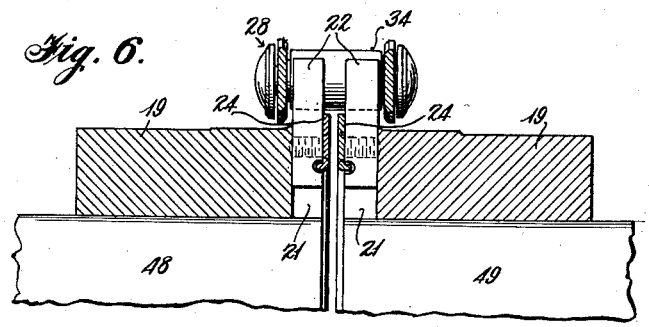
Figure 7:
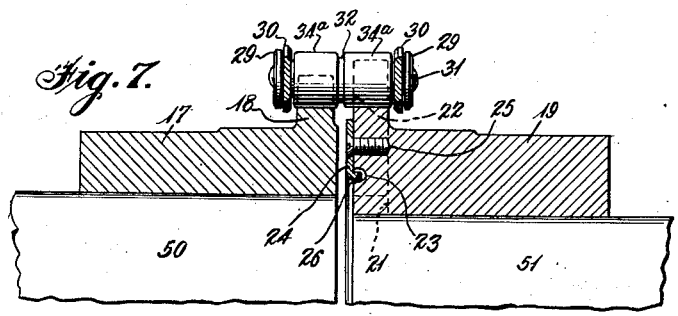
Figure 8:
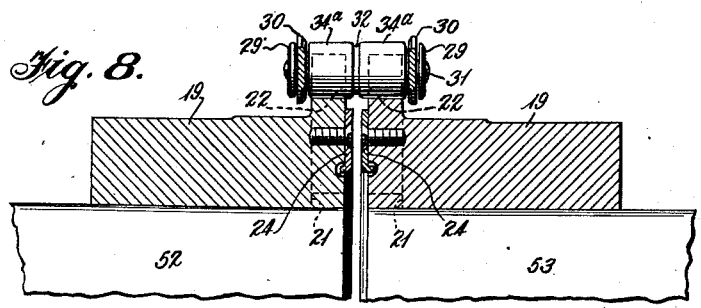
Figure 9:
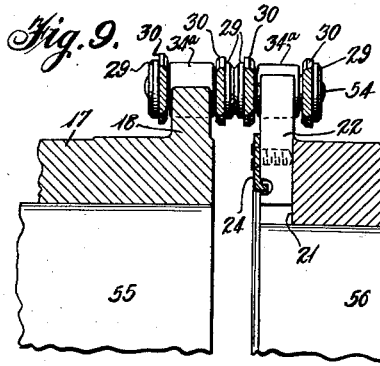
Figure 10:
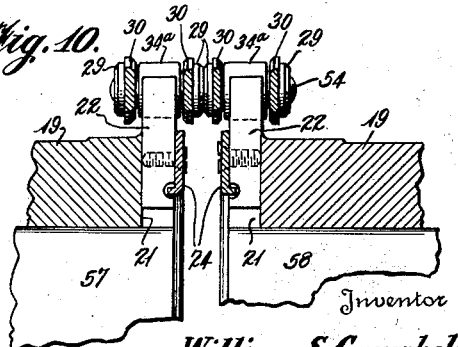
Figure 15:
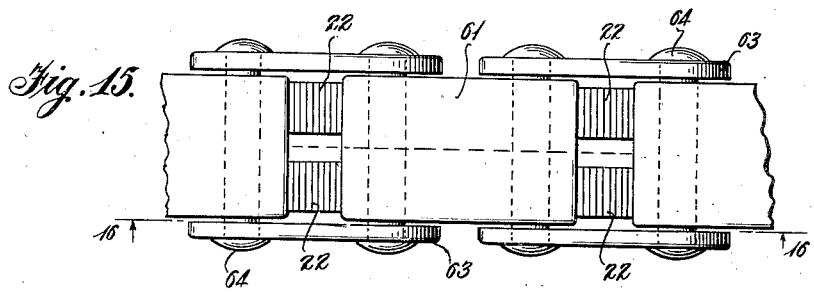
Figure 16:
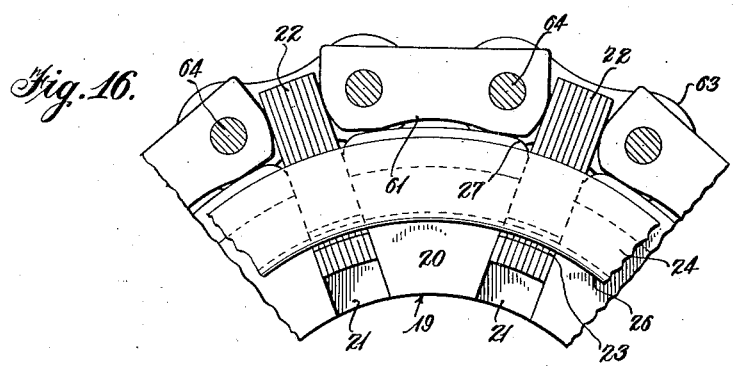
Figure 17:
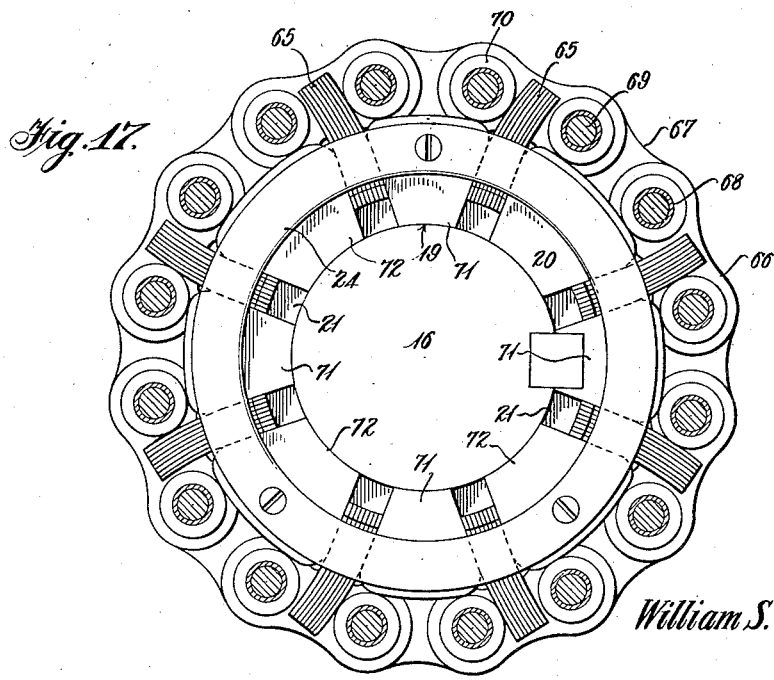

In the accompanying drawings forming a part of this specification and in which like numerals are employed to designate like parts throughout the same:

Figure 1 is a plan view, partly broken away, of one form of flexible resilient shaft coupling embodying this invention, Figure 2 is a transverse sectional view taken on line 2—2 of Fig. 1, Figure 3 is a transverse sectional view taken on line 3—3 of Fig. 1, Figure 4 is an elevational view of one coupling half or part illustrating a modified form of sprocket tooth construction, Figure 5 is a fragmentary enlarged elevational view illustrating a sprocket tooth construction of the type disclosed in Fig. 4, Figure 6 is a fragmentary, detail sectional view of a further modification of the invention, Figure 7 is a fragmentary, detail sectional view of a further modified form of coupling, Figure 8 is a fragmentary, detail sectional view of a still further modified form of coupling, Figure 9 is a detail, fragmentary sectional view of another form of coupling, Figure 10 is a detail, fragmentary sectional view of a further modified form of coupling, Figure 11 is a fragmentary plan view of a further modification of the invention, Figure 12 is a vertical sectional view taken on line 12—12 of Fig. 11, Figure 13 is a fragmentary plan view of a still further modification of the invention, Figure 14 is a vertical sectional view taken on line 14—14 of Fig. 13, Figure 15 is a fragmentary plan view of still another modification of the invention, Figure 16 is a vertical sectional view taken on line 16—16 of Fig. 15, and Figure 17 is an end elevational view of one coupling half and illustrates a further modification.

In the drawings, wherein for the purpose of illustration are shown the preferred embodiments of this invention, and particularly referring to Figs. 1 to 3, inclusive, the reference numerals 15 and 16 designate the two shafts which are arranged in end to end relation and which are to be drivingly interconnected by one form of resilient flexible coupling embodying this invention. The shaft 15 has keyed thereto the hub 17 of a cut tooth sprocket wheel which includes the rigid, integral teeth 18.

The shaft 16 has keyed thereto the hub 19 of a special form of sprocket wheel. Figs. 1 and 2 disclose the end face 20 of the hub 19 as having formed therein a suitable number of equispaced, radially extending grooves 21 which function as pockets for the laminated steel spring sprocket teeth 22. Each one of these teeth 22 is formed of a suitable number of laminations or leaves. The teeth are arranged in the grooves or pockets 21 so that a substantial portion of each tooth projects radially from the periphery of the hub 19. The laminations or leaves are positioned so that the projecting portions of the teeth will resiliently yield circumferentially of the sprocket hub 19.

To retain all of the teeth 22 against both axial and radial movement relative to their pockets or grooves, the several laminations of all of the teeth are provided with edge notches which collectively form a transverse groove 23 in the exposed face of each tooth, as is clearly illustrated in Fig. 1, and a ring 24 is secured by a suitable number of screws, or the like, 25 so as to bridge the various grooves or tooth pockets 21. The inner edge of this ring 24 is provided with a laterally projecting flange 26 which enters the grooves 23 of the several teeth. To prevent cutting or breaking the laminations of the resilient teeth at the point where they emerge radially from the grooves or pockets 21, the edges of these grooves or pockets are rounded, as at 27. These rounded edges are best illustrated in Fig. 2.

To interconnect the hubs 17 and 19 of the two shafts, a roller chain, designated in its entirety by the reference character 28, encircles and meshes with the teeth carried by both hubs. This chain 28 is, of course, endless, but is capable of being removed from the sprocket wheels by simply uncoupling the same in the manner conventional to sprocket chains of this character. This sprocket chain is of conventional construction and includes the outside and inside links 29 and 30 respectively which have their side plates or bars interconnected by chain pins 31 and bushings 32 in the conventional manner. Journaled on each bushing is a single roller 34. By inspecting Fig. 1, it will be seen that each one of the rollers 34 meshes with the teeth 18 and 22 of the two different hubs 17 and 19. This chain connection between the two sprocket wheels allows for a limited amount of end float of the shafts and a reasonable amount of misalignment. Due to the resiliency of the laminated spring steel teeth 22, relative movement will be permitted in a circumferential direction between the chain 28 and the hub 19 which is keyed to the shaft 16. This relative circumferential movement will function to absorb sudden and abnormal shocks.

Where the operating conditions suggest the advisability of protecting the coupling from dust, dirt or other adverse conditions, a lubricant and dust tight casing may be provided. Figs. 1 to 3, inclusive, disclose a suitable casing which consists of the separable halves 35 and 36. Each one of these halves is provided with a packing ring 37 which is arranged to seal between the associated shaft hub and the casing half or section. The casing halves 35 and 36 are flanged at their peripheries, as is best illustrated in Fig. 1 and designated by the reference character 38, to be interfitted one within the other. A suitable number of securing devices 39 join the flanged peripheries of the casing parts 35 and 36. A suitable lubricant may be introduced into the chamber formed by the casing parts by removing the plug 40.

Figs. 4 and 5 illustrate a modification of the coupling half or part disclosed in Fig. 2. This modification is directed to the idea of eliminating the necessity of rounding the edges 27 of the tooth grooves or pockets. In this modification, the shaft 16 has keyed thereto the hub 41 which has formed in its end face a suitable number of tooth grooves or pockets 42. The side walls 43 of each one of these grooves or pockets 42 are straight or flat throughout their radial dimensions as no rounded outer edges are provided. These grooves 42 are of greater width so as to receive the wider base portions 44 of the laminated spring steel teeth 45. A suitable number of laminations at each side of each tooth are gradually reduced in length, as is indicated by the reference character 46, so as to protect the remaining, full length laminations. In other words, these shorter side laminations prevent the full length laminations from contacting with the comparatively sharp edges 47 with the result that the full length laminations will not be cut or broken by contacting with these edges. The various laminated teeth 44 are retained in their grooves or pockets 42 by means of the ring 24 disclosed and described in connection with Figs. 1 and 2. The same type of roller chain 28 is provided to connect the circumferentially resilient teeth 45 of this coupling half with a second coupling half which may be of the character illustrated in Figs. 1 and 3.

In the modification disclosed in Fig. 6, the two shafts 48 and 49 are provided with coupling halves of the character illustrated in Fig. 2; i. e., each shaft is provided with a sprocket wheel hub 19 formed at its inner end with tooth grooves 21 or pockets 21 to receive the laminated spring steel teeth 22 which are retained in place by means of the securing ring 24. The same form of roller chain 28, having one-piece rollers 34, is provided for interconnecting the teeth 22 of the two hubs 19. This form of coupling, therefore, distinguishes from the coupling disclosed in Figs. 1 to 3, inclusive, by having circumferentially yieldable resilient sprocket teeth carried by the hubs keyed to both of the shafts. Naturally, this type of coupling will absorb more severe and sudden shocks than will the coupling disclosed in Figs. 1 to 3, inclusive.

Figs. 7 and 8 disclose the resilient tooth arrangement of Figs. 1 and 6 with a modified form of chain applied thereto. The chain disclosed in these two figures includes a separate roller section 34a for each set of sprocket teeth. This chain roller arrangement is very desirable for high speed drive because it allows for relative sliding movement between the teeth of the two sprocket wheels and their respective roller sections with the said relative sliding movements being independent of each other insofar as the two different sprocket wheels are concerned.

Regarding Fig. 7, the shaft 50 has mounted thereon a sprocket wheel hub 17 which is formed with integral, cut sprocket teeth 18. The shaft 51 has mounted thereon the sprocket wheel hub 19 which is formed with a suitable number of radially extending grooves or pockets 21 to receive the laminated steel spring teeth 22. These teeth are retained in the grooves against both axial and radial displacement by means of the ring 24 with its flange 26 which is received within the grooves 23 formed in the various teeth. This ring is retained in place by the screws 25.

The separate roller sections 34a are journaled on the common bushing 32 which joins the side bars 30 of the inside chain links. A chain pin 31 is employed for joining the side bars 29 of the outside link.

In Fig. 8, the shafts 52 and 53 each has keyed thereto a sprocket hub 19. The adjacent faces of both of these hubs are provided with the radially arranged grooves or pockets 21 to receive the laminated spring steel teeth 22. These teeth are retained in place by means of the ring 24.

As was described in connection with Fig. 7, the chain roller sections 34a are separately mounted on a common bushing 32 which joins the side bars 30 of the inside links. The outside links 29 are joined by the chain pin 31.

Figs. 9 and 10 are employed to illustrate the resilient sprocket tooth arrangements of Figs. 1 and 6 with a still further modified form of sprocket chain applied thereto. The sprocket chain disclosed in Figs. 9 and 10 is of the multiple width or three bar type, which is the type of chain likely to be used for extremely heavy service. In this type of chain, the chain pins 54 connect two sets or pairs of side bars 29 or the two outside links arranged in parallelism. The side bars 30 also are provided in pairs which may be joined by one or two bushings, as desired. An independent roller 34a is provided for each sprocket wheel.

The shafts 55 and 56 in Fig. 9 are provided with sprocket wheel hubs 17 and 19 respectively. The hub 17 is provided with cut sprocket teeth 18 which are formed integrally with the hub. The hub 19 is provided with a suitable number of tooth receiving grooves or pockets 21 in which the laminated steel spring teeth 22 are arranged. These various laminated spring teeth are retained in place by the securing ring 24.

In Fig. 10, the shafts 57 and 58 are each provided with a hub 19 formed with the tooth receiving grooves or pockets 21. The laminated spring steel teeth 22 are arranged in the various pockets and are retained in place by the securing rings 24.

Figs. 11 and 12 disclose the coupling halves or sprockets illustrated in Figs. 1 to 3, inclusive, with a still further modified form of sprocket chain applied thereto. In Fig. 11, one sprocket wheel is illustrated as being provided with integral cut teeth 18. The other sprocket wheel is illustrated as being provided with laminated steel spring teeth 22. Fig. 12 discloses the laminated spring steel teeth 22 as being mounted in grooves or pockets 21 formed in the face 20 of the hub 19. The securing ring 24 is illustrated as being employed to retain the teeth 22 in position within their grooves or pockets.

By comparing Figs. 2 and 3, it will be noted that a sprocket which is provided with integral cut teeth has twice as many teeth as a sprocket which is provided with the laminated spring steel teeth. The chain structure disclosed in Figs. 11 and 12 is especially designed to take care of this difference in the number of teeth on the two different types of sprockets. The sprocket wheel with the integral, cut teeth 18 has associated therewith the staggered side bars or plates 59 which form inside links. Arranged in parallelism with the middle or intermediate ones of these inside link side plates 59 are the side plates 59a which constitute outside link side plates for the sprocket provided with the resilient laminated steel spring teeth 22. It will be appreciated, therefore, that the middle or intermediate side plates 59 function as inside link side plates for the sprocket wheel having the teeth 18 and outside link side plates in combination with the side plates 59a for the sprocket wheel having the laminated teeth 22. Regular outside link side plates 60 are provided to complete the outer side of the portion of the chain associated with the rigid cut teeth 18. To provide inside links for the portion of the chain which meshes with the laminated teeth 22, one-piece blocks 61 are provided. The chain pins 62 are employed to interconnect the outside link side plates 59a and 60 with the two sets of side plates 59. The blocks 61 articulate on these chain pins 62. The sets of side plates 59 are interconnected at their opposite ends by bushings 63, see Fig. 12, on which the rollers 64 are journaled. These rollers mesh with the rigid cut teeth 18.

Figs. 13 and 14 illustrate the same sprocket structures as those disclosed in Figs. 11 and 12. The same reference characters, therefore, will be applied to the sprocket elements. The sprocket chain structure of Figs. 13 and 14, however, differs from the chain structure disclosed in Figs. 11 and 12 by the omission of the intermediate side plates 59. The same reference characters, therefore, will be applied to the similar chain elements. In this modified structure, the chain pins 62 connect the various side plates 59, 59a and 60. The chain link blocks 61 articulate on these chain pins. The rollers 64 are journaled on the chain pins.

Figs. 15 and 16 illustrate a resilient flexible coupling which embodies the inside chain link block feature of the modifications disclosed in Figs. 11 to 14, inclusive, but being designed to operate with sprockets or coupling halves where the teeth of both sprockets or halves are laminated.

In Fig. 16, the coupling 19 has its end face 20 illustrated as having formed therein a suitable number of equi-spaced, radially extending grooves 21 which function as pockets for the laminated steel spring sprocket teeth 22. These various teeth 22 are formed to provide the transverse grooves 23 for the reception of the inwardly projecting flange 26 formed on the securing ring 24. The rounded corners 27, described specifically in connection with Fig. 2, also are illustrated. It is to be understood that Fig. 15 discloses a coupling assembly which includes two hub and sprocket arrangements of the character illustrated in Fig. 16.

With this arrangement, the laminated steel spring teeth 22 for the two sprockets or coupling halves are arranged in transverse alignment. Meshing with these aligned teeth is a chain which is formed of inside chain link blocks 61 and outside link side plates 63. Chain pins 64 are employed for pivotally connecting the inside and outside links.

In Fig. 17, there is disclosed an arrangement in which the laminated steel spring teeth 65 are preloaded for the purpose of preventing backlash.

In this structure, the shaft 16 has keyed thereto the hub 19. The face 20 of this hub has formed therein the usual radially extending grooves 21 which act as pockets for the preloaded, laminated teeth 65. As has been described in connection with preceding forms of the invention, these laminated steel spring teeth are retained in their grooves or pockets 21 by means of a retaining ring 24.

The chain meshing with the teeth 65 includes the inside link side plates 66, the outside link side plates 67, the bushings 68 which connect the inside link side plates, and the chain pins 69 which connect the outside link side plates and form with the bushings 68 the articulated joints for the respective links. Rollers 70 are mounted on the bushings 68 for performing the usual function of reducing frictional contact between the laminated teeth and the coupling chain.

In this figure, the radially projecting portions of adjacent laminated teeth are illustrated as being bowed or flexed circumferentially in opposite directions. This effect is accomplished by employing a chain which has a uniform pitch throughout its length and meshing this chain with the spring teeth 65 which are arranged in grooves 21 that are located different distances from each other to provide the teeth with different pitches. For example, the portions 71 formed in the coupling 19 by certain grooves 21 are of less width than the portions 72. This difference in width results from locating the grooves 21 which form the spaces 71 closer together than the grooves 21 which form the spaces 72. This difference in pitch between the sprocket teeth and the coupling chain accomplishes preloading of the said teeth.

In this specific example, four of the spring teeth 65 are preloaded, or placed under compression, in one circumferential direction, while the remaining four laminated teeth 65 are preloaded or placed under compression in the opposite direction. Therefore, regardless of the circumferential direction in which the coupling chain is shifted relative to this coupling, for the purpose of absorbing shock and abnormal loads, the return of the coupling chain past its normal position relative to the sprocket, as a result of dissipation of the force which produced the shock or abnormal load, will be prevented by four of the laminated teeth which are preloaded in a manner to resist this rearward or back-lash movement of the coupling chain.

It will be appreciated that in each one of these various flexible resilient coupling structures relative radial or rolling movement may take place between the various sprocket teeth and the rollers of the chain to accommodate slight misalignment of the respective shafts. The teeth of the sprockets, also, will be capable of sliding movement axially of the rollers to accommodate end float of the shaft. Each coupling structure is provided with at least one sprocket wheel having resilient teeth which will allow for relative angular movement between the two shafts or between the chain and the shaft provided with the resilient sprocket teeth. Of course, where both sprockets are provided with circumferentially yieldable teeth, the coupling is capable of absorbing more severe and sudden shocks than is possible where only one sprocket is provided with resilient teeth.

It will be appreciated that a great many additional combinations of structural modifications could have been illustrated and described. Rather than to burden the disclosure with all of these conceivable combinations, it will be noted that the two different types of resilient teeth disclosed best in Figs. 2, 4 and 5 can be interchangeably used in the combinations disclosed in Figs. 6 to 16, inclusive. The back-lash arrangement of Fig. 17 can be incorporated in any of the other structures. The casing disclosed in Figs. 1 to 3, inclusive, also can be employed with any or all of the coupling structures disclosed in Figs. 4 to 16, inclusive. The structure disclosed in Figs. 1 to 3, inclusive, likewise can be employed without an enclosing casing.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A resilient flexible coupling for two shafts arranged in end to end relation comprising a coupling hub on each shaft, flexible meshable connecting means loosely associated with said hubs, and means carried by each hub meshing with said meshable connecting means, the means carried by at least one of said hubs comprising a plurality of radially extending groups of spring steel leaves arranged so as to be capable of resiliently yielding in a direction circumferentially of its hub.

2. A resilient flexible coupling for two shafts arranged in end to end relation comprising a coupling hub on each shaft, flexible meshable connecting means loosely encircling adjacent portions of said hubs, and means carried by each hub meshing with said meshable connecting means, the means carried by at least one of said hubs comprising a plurality of radially extending groups of spring steel leaves arranged so as to be capable of resiliently yielding in a direction circumferentially of its hub.

3. A resilient flexible coupling for two shafts arranged in end to end relation comprising a toothed hub mounted on each shaft, and a hub encircling chain meshing with the teeth of both hubs, the teeth of at least one of said hubs being connected thereto to permit resilient angular yielding of its hub and shaft relative to the other hub and shaft.

4. A resilient flexible coupling for two shafts arranged in end to end relation comprising an endless chain loosely encircling said shafts, and means carried by each shaft terminal meshing with said chain, the means carried by at least one of said shafts permitting resilient angular yielding of its shaft relative to the chain.

5. A resilient flexible coupling for two shafts arranged in end to end relation comprising a toothed sprocket wheel mounted on each shaft, the teeth of at least one of said wheels being resiliently yieldable circumferentially of its wheel, and a sprocket wheel encircling chain meshing with the teeth of both wheels.

6. A resilient flexible coupling for two shafts arranged in end to end relation comprising a toothed sprocket wheel mounted on each shaft, the teeth of at least one of said wheels each being formed of spring steel constructed and arranged to be resiliently yieldable circumferentially of its wheel, and a sprocket wheel encircling chain meshing with the teeth of both wheels.

7. A resilient flexible coupling for two shafts arranged in end to end relation comprising a toothed sprocket wheel mounted on each shaft, the teeth of at least one of said wheels each being in the form of a laminated steel spring constructed and arranged to be resiliently yieldable circumferentially of its wheel, and a sprocket wheel encircling chain meshing with the teeth of both wheels.

8. A resilient flexible coupling for two shafts arranged in end to end relation comprising a coupling hub on each shaft, sprocket teeth carried by each hub, the sprocket teeth construction of at least one of said hubs comprising a plurality of radially extending pockets formed in the hub, a spring steel tooth body received in each pocket and projecting radially outwardly of the periphery of the hub, and means for holding said tooth bodies in their pockets, and articulate connecting means loosely encircling said hubs and meshing with the sprocket teeth.

9. A resilient flexible coupling for two shafts arranged in end to end relation comprising a coupling hub on each shaft, sprocket teeth carried by each hub, the sprocket teeth construction of at least one of said hubs comprising a plurality of radially extending pockets formed in the hub, a spring steel tooth body received in each pocket and projecting radially outwardly of the periphery of the hub, and means for holding said tooth bodies in their pockets, and a hub encircling chain meshing with the sprocket teeth of both hubs.

10. A resilient flexible coupling for two shafts arranged in end to end relation comprising a coupling hub on each shaft, sprocket teeth carried by each hub, the sprocket teeth construction of at least one of said hubs comprising a plurality of radially extending pockets formed in the hub, a laminated spring steel tooth received in each pocket and projecting radially outwardly of the periphery of the hub, and means for holding said toothed members in their pockets, and connecting means jointed for articulation and loosely encircling said hubs and meshing with the sprocket teeth.

11. A resilient flexible coupling for two shafts arranged in end to end relation comprising a coupling hub on each shaft, sprocket teeth carried by each hub, the sprocket teeth construction of at least one of said hubs comprising a plurality of radially extending pockets formed in the hub, a laminated spring steel tooth received in each pocket and projecting radially outwardly of the periphery of the hub, and means for holding said laminated teeth in their respective pockets, and a hub encircling chain meshing with the sprocket teeth of both hubs.

12. A flexible resilient coupling for two shafts arranged in end to end relation comprising a coupling hub on each shaft, sprocket teeth carried by each hub, the sprocket teeth construction of at least one of said hubs comprising a plurality of radially extending grooves formed in the end face of the hub, a spring steel tooth body received in each groove and projecting radially outwardly of the periphery of the hub, and means for holding said tooth bodies in their grooves against axial and radial bodily movement, and a hub encircling chain meshing with the sprocket teeth of both hubs.

13. A resilient flexible coupling for two shafts arranged in end to end relation comprising a coupling hub on each shaft, sprocket teeth carried by each hub, the sprocket teeth construction of at least one of said hubs comprising a plurality of radially extending grooves formed in the end face of the hub, a laminated spring steel tooth received in each groove and projecting radially outwardly of the periphery of the hub, and means for holding said laminated teeth in their grooves against axial and radial bodily movement, and a hub encircling chain meshing with the sprocket teeth of both hubs.

14. A resilient flexible coupling for two shafts arranged in end to end relation comprising a coupling hub on each shaft, sprocket teeth carried by each hub, the sprocket teeth construction of at least one of said hubs comprising a plurality of radially extending grooves formed in the end face of the hub, a laminated spring steel tooth body received in each groove and projecting radially outwardly of the periphery of the hub, said tooth bodies each being arranged to be resiliently yieldable circumferentially of its hub and certain of the laminations at each side of the body being shorter than the intermediate laminations so as to hold the full length intermediate laminations out of contact with the side walls of the groove in which said laminated body is received, means for holding said tooth bodies in their grooves against axial and radial bodily movement, and a hub encircling chain meshing with the sprocket teeth of both hubs.

15. A resilient flexible coupling for two shafts arranged in end to end relation comprising a coupling hub on each shaft, sprocket teeth carried by each hub, the sprocket teeth construction of at least one of said hubs comprising a plurality of radially extending grooves formed in the end face of the hub, a laminated spring steel tooth received in each groove and projecting radially outwardly of the periphery of the hub, each of said teeth having a transverse groove formed therein, and a clamping ring having a circumferential flange received in the grooves of the teeth fastened to the hub to hold the teeth against axial and radial bodily movement, and a hub encircling chain meshing with the sprocket teeth of both hubs.

16. A resilient flexible coupling for two shafts arranged in end to end relation comprising a resilient toothed sprocket on each shaft, and a chain encircling said sprockets and meshing with their resilient teeth.

17. A resilient flexible coupling for two shafts arranged in end to end relation comprising a coupling hub on each shaft, meshable connecting means encircling said hubs, and teeth carried by each hub meshing with said meshable connecting means, the teeth carried by at least one of said hubs being capable of resiliently yielding circumferentially of its hub with certain adjacent teeth having a pitch of different length than the remaining adjacent teeth and with all of the teeth having a different pitch than the pitch of the meshable connecting means.

18. A resilient flexible coupling for two shafts comprising a sprocket wheel mounted on each shaft with at least one of said wheels having resilient teeth, and a chain meshing with both sprocket wheels.

19. A resilient flexible connection for two shafts arranged in end to end relation comprising a coupling hub on each shaft, meshable connecting means loosely encircling adjacent portions of said hubs, said meshable connecting means being formed of a plurality of articulated sections with a plurality of openings which extend radially entirely through certain of said sections, and projections carried by each hub and extending radially outwardly into the openings of said meshable connecting means, said projections each being adapted to engage at least three of the radially extending sides of the opening it enters, the radial projections carried by at least one of said hubs being capable of resiliently yielding as a result of force being applied thereagainst by two of the said radially extending sides engaged thereby.

20. A resilient flexible coupling for two shafts arranged in end to end relation comprising a coupling hub on each shaft, radial projections carried by each hub, the radial projections of at least one of said hubs comprising a plurality of radially extending groups of spring steel leaves, pockets formed in the hub to receive the inner portions of said groups of leaves, means for holding said groups of leaves in their pockets, and flexible connecting means loosely encircling said hubs and meshing with the outer portions of said groups of leaves.

21. A resilient flexible coupling for two shafts arranged in end to end relation comprising a coupling hub on each shaft, radial projections carried by the adjacent ends of said hubs, the radial projections carried by at least one of said hubs being capable of resiliently yielding in a direction circumferentially of its hub, and endless flexible meshable connecting means, having openings to receive the radial projections, loosely encircling adjacent portions only of said hubs.

22. A resilient flexible coupling for two shafts arranged in end to end relation comprising a coupling hub on each shaft, radial projections carried by the adjacent end portions of said hubs, the radial projections carried by at least one of said hubs being capable of resiliently yielding in a direction circumferentially of its hub, and meshable connecting means, having openings extending entirely therethrough to receive the radial projections, loosely associated with the hubs, said meshable connecting means being engageable with the hubs for radial support independently of the radial projections.

23. A resilient flexible coupling for two shafts arranged in end to end relation comprising an endless flexible meshable connecting means having radial openings, loosely encircling adjacent end portions of the shaft, and means carried by each shaft end portion adapted to mesh with the meshable connecting means by projecting into its radial openings, the means carried by at least one of said shafts being flexible to permit resilient angular yielding of its shaft relative to the said connecting means.

WILLIAM S. CAMPBELL.